United States Patent
Meagher et al.

(10) Patent No.: US 7,602,814 B2
(45) Date of Patent: Oct. 13, 2009

(54) SYSTEMS AND METHODS FOR MAPPING AND MULTIPLEXING WIDER CLOCK TOLERANCE SIGNALS IN OPTICAL TRANSPORT NETWORK TRANSPONDERS AND MULTIPLEXERS

(75) Inventors: Kevin S. Meagher, Bowie PG, MD (US); Jack Mateosky, West River, MD (US); Steven A. Surek, Leonardo, NJ (US)

(73) Assignee: Ciena Corporation, Linthicum, MD (US)

( * ) Notice: Subject to any disclaimer, the term of this patent is extended or adjusted under 35 U.S.C. 154(b) by 364 days.

(21) Appl. No.: 11/796,774

(22) Filed: Apr. 30, 2007

(65) Prior Publication Data

US 2008/0267223 A1    Oct. 30, 2008

(51) Int. Cl.
  *H04J 3/06* (2006.01)
(52) U.S. Cl. .................................... 370/505
(58) Field of Classification Search ........ None
  See application file for complete search history.

(56) References Cited

U.S. PATENT DOCUMENTS

| | | | | |
|---|---|---|---|---|
| 5,343,476 A | * | 8/1994 | Urbansky | 370/506 |
| 6,339,628 B1 | * | 1/2002 | Yoshida | 375/376 |
| 7,180,914 B2 | * | 2/2007 | Walker et al. | 370/505 |
| 2002/0027929 A1 | * | 3/2002 | Eaves | 370/505 |
| 2004/0042500 A1 | * | 3/2004 | Christiansen | 370/509 |
| 2004/0202198 A1 | | 10/2004 | Walker et al. | |
| 2007/0071443 A1 | | 3/2007 | Fukumitsu et al. | |
| 2007/0116061 A1 | * | 5/2007 | Meagher et al. | 370/503 |
| 2007/0189336 A1 | * | 8/2007 | Zou | 370/505 |
| 2008/0044183 A1 | * | 2/2008 | Perkins et al. | 398/58 |
| 2009/0010280 A1 | * | 1/2009 | Surek | 370/474 |

* cited by examiner

*Primary Examiner*—Min Jung
(74) *Attorney, Agent, or Firm*—Clements Bernard PLLC; Christopher L. Bernard; Tyler S. Brown

(57) ABSTRACT

The present invention provides systems and methods for mapping and multiplexing wider clock tolerance signals in Optical Transport Network (OTN) transponders and multiplexers. In one exemplary embodiment, the present invention allows wide tolerance signals, such as a 10 GbE with a ±100 PPM clock tolerance, to be 100% transparently mapped asynchronously into OTU2-LAN rate transport signals. In another exemplary embodiment, the present invention allows wide tolerance signals, such as a 10 GbE with a ±100 PPM clock tolerance, to be 100% transparently multiplexed asynchronously in to OTU3-LAN rate transport signals. The present invention utilizes extra Negative Justification Opportunities (NJO) in either unused OPUk overhead or in OPUk payload area and Positive Justification Opportunities (PJO) in OPUk payload area. Advantageously, the extra NJO and PJO provide additional bandwidth for client data rate offsets beyond OTN specifications.

20 Claims, 15 Drawing Sheets

3824

| DATA |
|---|

⋮

| DATA | | | |
|---|---|---|---|
| DATA | | | |
| DATA | | | |
| DATA | | | |
| DATA | | | |
| DATA | | | |
| DATA | | | |
| PJ04 | PJ02 | PJ03 | PJ01 |
| JC | JC | JC | NJO1 |
| NJO4 | NJO2 | NJO3 | PSI |

| Mapping | Available ODUK bytes | M | N | ST | Yc | Ys | Y Absolute PPM | FSB | Available Payload Bytes | alpha (average long term justification rate) | | |
|---|---|---|---|---|---|---|---|---|---|---|---|---|
| | | | | | | | | | | negative offset | zero offset | positive offset |
| ODU1 | 15296 | 238 | 239 | 15232 | 20 | 20 | 40 | 0 | 15232 | 0.60928 | 0 | -0.60928 |
| ODU1 | 15296 | 238 | 239 | 15232 | 100 | 10 | 110 | 0 | 15232 | 1.67552 | 0 | -1.67552 |
| ODU1 | 15296 | 238 | 239 | 15232 | 100 | 20 | 120 | 0 | 15232 | 1.82784 | 0 | -1.82784 |
| ODU2 | 15296 | 237 | 239 | 15168 | 20 | 20 | 40 | 64 | 15232 | 0.60672 | 0 | -0.60672 |
| ODU2 | 15296 | 237 | 239 | 15168 | 100 | 10 | 110 | 64 | 15232 | 1.66848 | 0 | -1.66848 |
| ODU2 | 15296 | 237 | 239 | 15168 | 100 | 20 | 120 | 64 | 15232 | 1.82016 | 0 | -1.82016 |
| ODU3 | 15296 | 236 | 239 | 15104 | 20 | 20 | 40 | 128 | 15232 | 0.60416 | 0 | -0.60416 |
| ODU3 | 15296 | 236 | 239 | 15104 | 100 | 10 | 110 | 128 | 15232 | 1.66144 | 0 | -1.66144 |
| ODU3 | 15296 | 236 | 239 | 15104 | 100 | 20 | 120 | 128 | 15232 | 1.81248 | 0 | -1.81248 |

| Trib 4 | |
|---|---|

⋮

| Trib 4 | |
|---|---|
| Trib 3 | |
| Trib 2 | |
| Trib 1 | |
| Trib 4 | PJO2 |
| Trib 3 | PJO2 |
| Trib 2 | PJO2 |
| Trib 1 | PJO2 |

| PJO5 | PJO3 | PJO4 | PJO1 |
|---|---|---|---|
| PJO5 | PJO3 | PJO4 | PJO1 |
| PJO5 | PJO3 | PJO4 | PJO1 |
| PJO5 | PJO3 | PJO4 | PJO1 |
| JC | JC | JC | NJO1 |
| NJO4 | NJO2 | NJO3 | PSI |

| Multiplexing | Available ODUK bytes | M | N | ST | Yc | Ys | Y Absolute PPM | Tribs | FSB per trib | Available Payload Bytes | alpha (average long term justification rate) | | |
|---|---|---|---|---|---|---|---|---|---|---|---|---|---|
| | | | | | | | | | | | negative offset | zero offset | positive offset |
| ODTU12 | 15296 | 237 | 238 | 15231.731 | 20 | 20 | 40 | 4 | 0 | 15232 | 0.34036168 | -0.268908 | -0.8781768 |
| ODTU12 | 15296 | 237 | 238 | 15231.731 | 100 | 20 | 120 | 4 | 0 | 15232 | 1.55890017 | -0.268908 | -2.0967153 |
| ODTU23 | 15296 | 236 | 237 | 15231.46 | 20 | 20 | 40 | 4 | 0 | 15232 | 0.06917401 | -0.540084 | -1.1493428 |
| ODTU23 | 15296 | 236 | 237 | 15231.46 | 100 | 20 | 120 | 4 | 0 | 15232 | 1.2876908 | -0.540084 | -2.3678596 |
| ODTU13 | 15296 | 236 | 238 | 15167.462 | 20 | 20 | 40 | 16 | 4 | 15232 | 0.06888336 | -0.537815 | -1.1445136 |
| ODTU13 | 15296 | 236 | 238 | 15167.462 | 100 | 20 | 120 | 16 | 4 | 15232 | 1.28228034 | -0.537815 | -2.3579106 |

Source: Appendix I ITU-T Rec. G.709/Y.1331 (03/2003) – Prepublished version

*FIG. 7.*

3824 | DATA

⋮

| | | | |
|---|---|---|---|
| DATA | | | |
| DATA | | | |
| DATA | | | |
| DATA | | | |
| DATA | | | |
| DATA | | | |
| PJ04 | PJ02 | PJ03 | DATA |
| NJO4 | NJO2 | NJO3 | PJ01 |
| JC | JC | JC | NJO1 |
| RES | RES | RES | PSI |

| Mapping | Additional NJO Bytes in Payload | Available ODUK bytes | M | N | ST | Yc | Ys | Y Absolute PPM | FSB | Available Payload Bytes | negative offset | zero offset | positive offset |
|---|---|---|---|---|---|---|---|---|---|---|---|---|---|
| ODU1 | 3 | 15296 | 238 | 239 | 15229 | 20 | 20 | 40 | 0 | 15229 | 0.60916 | 0 | -0.60916 |
| ODU1 | 3 | 15296 | 238 | 239 | 15229 | 100 | 10 | 110 | 0 | 15229 | 1.67519 | 0 | -1.67519 |
| ODU1 | 3 | 15296 | 238 | 239 | 15229 | 100 | 20 | 120 | 0 | 15229 | 1.82748 | 0 | -1.82748 |
| ODU2 | 3 | 15296 | 237 | 239 | 15165 | 20 | 20 | 40 | 64 | 15229 | 0.6066 | 0 | -0.6066 |
| ODU2 | 3 | 15296 | 237 | 239 | 15165 | 100 | 10 | 110 | 64 | 15229 | 1.66815 | 0 | -1.66815 |
| ODU2 | 3 | 15296 | 237 | 239 | 15165 | 100 | 20 | 120 | 64 | 15229 | 1.8198 | 0 | -1.8198 |
| ODU3 | 3 | 15296 | 236 | 239 | 15101 | 20 | 20 | 40 | 128 | 15229 | 0.60404 | 0 | -0.60404 |
| ODU3 | 3 | 15296 | 236 | 239 | 15101 | 100 | 10 | 110 | 128 | 15229 | 1.66111 | 0 | -1.66111 |
| ODU3 | 3 | 15296 | 236 | 239 | 15101 | 100 | 20 | 120 | 128 | 15229 | 1.81212 | 0 | -1.81212 |

Source: Appendix I ITU-T Rec. G.709/Y.1331 (03/2003) – Prepublished version

*FIG. 9.*

3824 | Trib 4

⋮

| Trib 4 | | | |
|---|---|---|---|
| Trib 3 | | | |
| Trib 2 | | | |
| Trib 1 | | | |
| PJ05 | PJ03 | PJ04 | PJ02 |
| PJ05 | PJ03 | PJ04 | PJ02 |
| PJ05 | PJ03 | PJ04 | PJ02 |
| PJ05 | PJ03 | PJ04 | PJ02 |
| NJO4 | NJO2 | NJO3 | PJ01 |
| NJO4 | NJO2 | NJO3 | PJ01 |
| NJO4 | NJO2 | NJO3 | PJ01 |
| NJO4 | NJO2 | NJO3 | PJ01 |
| JC | JC | JC | NJO1 |
| RES | RES | RES | PSI |

| Multiplexing | Additional NJO Bytes in Payload | Available ODUK bytes | Nk | Nj | ST | Yc | Ys | Y Absolute PPM | Tribs | FSB per trib | Available Payload Bytes | alpha (average long term justification rate) | | |
|---|---|---|---|---|---|---|---|---|---|---|---|---|---|---|
| | | | | | | | | | | | | negative offset | zero offset | positive offset |
| ODTU12 | 3 | 15296 | 237 | 238 | 15228.731 | 20 | 20 | 40 | 4 | 0 | 15229 | 0.3402417 | -0.2689076 | -0.8780568 |
| ODTU12 | 3 | 15296 | 237 | 238 | 15228.731 | 100 | 20 | 120 | 4 | 0 | 15229 | 1.5585402 | -0.2689076 | -2.0963553 |
| ODTU23 | 3 | 15296 | 236 | 237 | 15228.46 | 20 | 20 | 40 | 4 | 0 | 15229 | 0.069054 | -0.5400844 | -1.1492228 |
| ODTU23 | 3 | 15296 | 236 | 237 | 15228.46 | 100 | 20 | 120 | 4 | 0 | 15229 | 1.2873308 | -0.5400844 | -2.3674996 |
| ODTU13 | 3 | 15296 | 236 | 238 | 15164.462 | 20 | 20 | 40 | 16 | 4 | 15229 | 0.0687634 | -0.5378151 | -1.1443936 |
| ODTU13 | 3 | 15296 | 236 | 238 | 15164.462 | 100 | 20 | 120 | 16 | 4 | 15229 | 1.2819203 | -0.5378151 | -2.3575506 |

Source: Appendix I ITU-T Rec. G.709/Y.1331 (03/2003) – Prepublished version

*FIG. 11.*

SYSTEMS AND METHODS FOR MAPPING AND MULTIPLEXING WIDER CLOCK TOLERANCE SIGNALS IN OPTICAL TRANSPORT NETWORK TRANSPONDERS AND MULTIPLEXERS

FIELD OF THE INVENTION

The present invention relates generally to optical networking. More specifically, the present invention relates to systems and methods for mapping and multiplexing wider clock tolerance signals in Optical Transport Network (OTN) transponders and multiplexers.

BACKGROUND OF THE INVENTION

Long haul transport of Ethernet is growing at 10 Gb/s and at 40 Gb/s. One of the preferred transport formats is specified in ITU-T G.709 Optical Transport Network (OTN). OTN specifies 110 Gb/s Ethernet LAN-PHY transport as Generic Frame Protocol (GFP) mapped into an asynchronous Optical Channel Transport Unit of level 2 (OTU2). However, network operators typically prefer a 100% bit transparent format. Several synchronous constant bit rate mappings have emerged that use the OTU2 Constant Bit Rate (CBRx-b) mapping but result in a higher than standard OTU2 bit rate (such as, 11.05 Gb/s from CIENA Corp. and Siemens, and 11.1 Gb/s from Cisco Systems). Another accepted method uses the standard asynchronous GFP mapping method but also carries the Ethernet preambles in reserved Optical Channel Payload of unit k (OPUk) overhead to provide some transparency (but not 100% bit-transparency) at the standard 10.7 Gb/s rate (such as CIENA Corp.). The move to 40 Gb/s transport uses the Optical Channel Transport Unit of level 3 (OTU3) format. At this time Ethernet is either carried as Packet over SONET (POS) at OC-768 and mapped into an OTU3 using the Regenerator Section level n (RSn) mapping or multiplexed as four 10 Gb/s Ethernet tributaries, each mapped into an Optical Channel Data Unit of level 2 (ODU2), into an OTU3 using the standard ODU[i]j mapping defined in G.709. For example, Stratalight Communications of Los Gatos, Calif. provides a multiplexer that maps four 10 G Ethernet LAN-PHY tributaries into ODU2's using the semi-transparent GFP plus preamble method and then multiplexes them into a proprietary OTU3. As before with OTU2, carriers prefer and will ask for 100% bit transparent multiplexing of four 10 G Ethernet LAN-PHY tributaries to an OTU3 even if it is at a slightly higher than standard rate. NTT Electronics Corporation (NEL) provides an integrated circuit that can be used to build a multiplexer for quad 100% bit transparent 10 G multiplexing to a higher than standard rate OTU3 and supports ±100 PPM (part per million) tributaries.

Transport carriers, such as long-haul providers, prefer 100% bit transparent transport of 10 Gb/s Ethernet LAN-PHY signals for various reasons. For instance, transparent transport provides simpler provisioning providing a connection that emulates fiber. Another reason is that some routers use the preamble and 64B/66B code words for proprietary control and data channels and dropping those bits disrupts router-to-router communications. The 10 Gb/s Ethernet LAN-PHY interface transmits at a rate of 10.3125 Gb/s±100 PPM. The G.709 OTUk asynchronous mapping (CBRx-a) provides justification opportunities to carry ±20 PPM payloads. As a result only synchronous mappings exist for 100% bit transparent 10 G Ethernet LAN-PHY transport. The asynchronous multiplexing (ODU[i]j) provides ±20 PPM per tributary signal.

Disadvantageously, there is not support for any of the various semi-transparent and 100% transparent 10 Gb/s Ethernet LAN-PHY (10 GbE) transport methods in the ITU-T OTN specifications because these do not fit with the OTUk and ODU[i]j models. The GFP plus Preamble forces data into unused overhead locations. The 100% bit transparent methods require higher than standard clock rates for OTU2-LAN signals and when multiplexed will require higher than standard OTU3 rate and other changes to include 100 PPM offsets.

Averaged over time the OTN Asynchronous mapping method provides ±45 PPM and asynchronous multiplexing ±75 PPM of client offset while allowing ±20 PPM of aggregate OTU3 offset (this does not provide much buffer for large short term variations). The NEL approach asynchronously maps the 10 GbE into an ODU2, but the ODU2 clock generator must vary the ODU2 clock to make up for client offset beyond ±45 PPM. The ±45 PPM ODU2's are asynchronously multiplexed into the ODU3. The ODU2 clock generator is complex and de-multiplexing the 10 GBE signals requires asynchronously de-multiplexing and asynchronously de-mapping complicating the 10 GbE TX clock generator. This method does not support multiplexing 100% transparent OTU2-LAN signals (11.05 Gb/s and 11.1 Gb/s) generated by synchronously mapping (CBRx-b) 10 Gb/s Ethernet Signals that are preferred by network operators for handoffs.

The Stratalight multiplexer does not provide multiplexing of 100% bit transparent 10 GbE and does not support multiplexing of OTU2-LAN rate tributaries. Although the NEL framer supports multiplexing of 100% bit rate transparent 10 GbE, it does not support multiplexing OTU2-LAN rate signals. Both existing systems and methods require OTU2-LAN rate signals be terminated to 10 GbE LAN-PHY before being multiplexed.

In the past 10 GbE links were used to inter-connect core routers internal to the carrier's networks, but now carriers are offering 10 GbE handoffs to commercial customers. As these proliferate, the need to carry these in 100% transparent OTU2-LAN rate signals will grow as will the need to 100% transparently multiplex these signals to 40 Gb/s and 100 Gb/s.

BRIEF SUMMARY OF THE INVENTION

In various exemplary embodiments, the present invention provides systems and methods for mapping and multiplexing wider clock tolerance signals in OTN transponders and multiplexers. In one exemplary embodiment, the present invention allows wide tolerance signals, such as a 10 GbE with a ±100 PPM clock tolerance, to be 100% transparently mapped asynchronously into OTU2-LAN rate transport signals. In another exemplary embodiment, the present invention allows wide tolerance signals, such as a 10 GbE with a ±100 PPM clock tolerance, to be 100% transparently multiplexed asynchronously in to OTU3-LAN rate transport signals. The present invention utilizes extra Negative Justification Opportunities (NJO) in unused OPUk overhead and Positive Justification Opportunities (PJO) in OPUk payload area. Advantageously, the extra NJO and PJO provide additional bandwidth for client data rate offsets beyond OTN specifications.

The addition of one NJO and PJO to the asynchronous multiplexing (ODU[i]j) provides greater than ±100 PPM of long term average offset and will handle short term large offset changes. This requires a few bytes extra depth in the source process elastic store to handle the additional NJO data and PJO stuffs. The Justification Control (JC) control source block requires additional logic to support the additional NJO and PJO states. The JC bit generation source block requires additional logic to support writing the extra JC bit codes. The elastic store in the sink direction requires a few extra bytes of depth to accommodate the additional NJO data and PJO stuffs. The CBR clock generator in the sink direction will have to support a wider range of clock frequency generation. The JC extraction sink block adds logic to recognize the additional JC codes and to coordinate data writes into the elastic store based on the JC codes.

In an exemplary embodiment of the present invention, a method for supporting wide clock tolerance signals in a G.709 Optical Transport Network includes adding one or more Negative Justification Opportunity bytes and one or more Positive Justification Opportunity bytes in a Optical Channel Payload of unit k frame, and utilizing one or more Justification Control bits to indicate the addition of the one or more Negative Justification Opportunity bytes and one or more Positive Justification Opportunity bytes, wherein the one or more Justification Control bits include unused bits specified in G.709, and the one or more Positive Justification Opportunity bytes are located in a payload area of the Optical Channel Payload of unit k frame. In one embodiment, the one or more Negative Justification Opportunity bytes are located in unused overhead bytes in the Optical Channel Payload of unit k frame. In another embodiment, the one or more Negative Justification Opportunity bytes are located in a payload area of the Optical Channel Payload of unit k frame, and an Optical Channel Data Unit of level k rate is increased responsive to the one or more Negative Justification Opportunity bytes. The method is utilized in both embodiments in Optical Channel Payload of unit k mapping processes and in Optical channel Data Tributary of unit jk multiplexing processes. The quantity of one or more Negative Justification Opportunity bytes and one or more Positive Justification Opportunity bytes is selected responsive to desired source offset and client offset frequency. The client offset frequency is ±100 parts per million. The one or more Positive Justification Opportunity bytes are spaced across rows in the Optical Channel Payload of unit k frame, and the one or more Negative Justification Opportunity bytes and one or more Positive Justification Opportunity bytes are re-ordered.

In another embodiment of the present invention, an Optical Transport Network transponder supporting wide clock tolerance signals includes a source block with an elastic store including one or more extra bytes depth, wherein the extra bytes depth are responsive to one or more Negative Justification Opportunity bytes and one or more Positive Justification Opportunity bytes, a justification control block including logic to support the one or more Negative Justification Opportunity bytes and one or more Positive Justification Opportunity bytes, and a justification control bit generation block including logic to support writing extra justification control bit codes responsive to the one or more Negative Justification Opportunity bytes and one or more Positive Justification Opportunity bytes, and a sink block with an elastic store including one or more extra bytes depth, wherein the extra bytes depth are responsive to the one or more Negative Justification Opportunity bytes and one or more Positive Justification Opportunity bytes, a constant bit rate clock generator including support for the wide clock tolerance, and a justification control extraction block including logic to recognize the extra justification control bit codes responsive to the one or more Negative Justification Opportunity bytes and one or more Positive Justification Opportunity bytes, wherein the one or more Justification Control bits include unused bits specified in G.709, and the one or more Positive Justification Opportunity bytes are located in a payload area of an Optical Channel Payload of unit k frame. In one embodiment, the one or more Negative Justification Opportunity bytes are located in unused overhead bytes in the Optical Channel Payload of unit k frame. In another embodiment, the one or more Negative Justification Opportunity bytes are located in a payload area of the Optical Channel Payload of unit k frame, and an Optical Channel Data Unit of level k rate is increased responsive to the one or more Negative Justification Opportunity bytes. The quantity of one or more Negative Justification Opportunity bytes and one or more Positive Justification Opportunity bytes is selected responsive to desired source offset and client offset frequency.

In yet another exemplary embodiment of the present invention, an Optical Transport Network multiplexer supporting wide clock tolerance signals includes a source block with an elastic store including one or more extra bytes depth, wherein the extra bytes depth are responsive to one or more Negative Justification Opportunity bytes and one or more Positive Justification Opportunity bytes, a justification control block including logic to support the one or more Negative Justification Opportunity bytes and one or more Positive Justification Opportunity bytes, and a justification control bit generation block including logic to support writing extra justification control bit codes responsive to the one or more Negative Justification Opportunity bytes and one or more Positive Justification Opportunity bytes, and a sink block with an elastic store including one or more extra bytes depth, wherein the extra bytes depth are responsive to the one or more Negative Justification Opportunity bytes and one or more Positive Justification Opportunity bytes, a constant bit rate clock generator including support for the wide clock tolerance, and a justification control extraction block including logic to recognize the extra justification control bit codes responsive to the one or more Negative Justification Opportunity bytes and one or more Positive Justification Opportunity bytes, wherein the one or more Justification Control bits include unused bits specified in G.709, and the one or more Positive Justification Opportunity bytes are located in a payload area of an Optical Channel Payload of unit k frame. In one embodiment, the one or more Negative Justification Opportunity bytes are located in unused overhead bytes in the Optical Channel Payload of unit k frame. In another embodiment, the one or more Negative Justification Opportunity bytes are located in a payload area of the Optical Channel Payload of unit k frame, and an Optical Channel Data Unit of level k rate is increased responsive to the one or more Negative Justification Opportunity bytes. The quantity of one or more Negative Justification Opportunity bytes and one or more Positive Justification Opportunity bytes is selected responsive to desired source offset and client offset frequency.

BRIEF DESCRIPTION OF THE DRAWINGS

The present invention is illustrated and described herein with reference to the various drawings, in which like reference numbers denote like method steps and/or system components, respectively, and in which:

FIG. 4 is a block diagram of an exemplary embodiment of the present invention with additional NJO and PJO justification opportunities added to the OPUk mapping process to accommodate wide clock tolerance signals;

FIG. 5 is a table illustrating a calculation of the required NJO/PJO bytes for different bit-rate tolerances for the OPUk mapping process to accommodate wide clock tolerance signals according to the exemplary embodiment illustrated in FIG. 4;

FIG. 6 is a block diagram of an exemplary embodiment of the present invention with additional NJO and PJO justification opportunities are added to the Optical channel Data Tributary Unit jk (ODTUjk) multiplexing process to accommodate wide clock tolerance signals;

FIG. 7 is a table illustrating a calculation of the required NJO/PJO bytes for different bit-rate tolerances for the ODTUjk multiplexing process to accommodate wide clock tolerance signals according to the exemplary embodiment illustrated in FIG. 6;

FIG. 8 is a block diagram of an exemplary embodiment of the present invention with additional NJO and PJO justification opportunities are added to the OPUk mapping process to accommodate wide clock tolerance signals along with a slight positive OTUk offset;

FIG. 9 is a table illustrating a calculation of the required NJO/PJO bytes for different bit-rate tolerances for the OPUk mapping process to accommodate wide clock tolerance signals according to the exemplary embodiment illustrated in FIG. 8;

FIG. 10 is a block diagram of an exemplary embodiment of the present invention with additional NJO and PJO justification opportunities are added to the ODTUjk multiplexing process to accommodate wide clock tolerance signals along with a slight positive OTUk offset;

FIG. 11 is a table illustrating a calculation of the required NJO/PJO bytes for different bit-rate tolerances for the ODTUjk multiplexing process to accommodate wide clock tolerance signals according to the exemplary embodiment illustrated in FIG. 10;

DETAILED DESCRIPTION OF THE INVENTION

In various exemplary embodiments, the present invention provides systems and methods for mapping and multiplexing wider clock tolerance signals in OTN transponders and multiplexers. In one exemplary embodiment, the present invention allows wide tolerance signals, such as a 10 GbE with a ±100 PPM clock tolerance, to be 100% transparently mapped asynchronously into OTU2-LAN rate transport signals. In another exemplary embodiment, the present invention allows wide tolerance signals, such as a 10 GbE with a ±100 PPM clock tolerance, to be 100% transparently multiplexed asynchronously in to OTU3-LAN rate transport signals. The present invention utilizes extra Negative Justification Opportunities (NJO) in unused OPUk overhead and Positive Justification Opportunities (PJO) in OPUk payload area. Advantageously, the extra NJO and PJO provide additional bandwidth for client data rate offsets beyond OTN specifications.

The addition of one NJO and PJO to the asynchronous multiplexing (ODU[i]j) provides greater than ±100 PPM of long term average offset and will handle short term large offset changes. This requires a few bytes extra depth in the source process elastic store to handle the additional NJO data and PJO stuffs. The JC control source block requires additional logic to support the additional NJO and PJO states. The JC bit generation source block requires additional logic to support writing the extra JC bit codes. The elastic store in the sink direction requires a few extra bytes of depth to accommodate the additional NJO data and PJO stuffs. The CBR clock generator in the sink direction will have to support a wider range of clock frequency generation. The JC extraction sink block adds logic to recognize the additional JC codes and to coordinate data writes into the elastic store based on the JC codes.

Advantageously, the present invention of supporting additional client data rate clock offsets supports multiplexing 100% transparent 10 GBE signals as well as 100% transparent OTU2-LAN rate signals. Any of the previously mentioned 10 G signals (OC-192, 10 GbE LAN-PHY, OTU2@10.7, OTU2-LAN@11.05 Gb/s and OTU2-LAN@ 11.1 Gb/s) can be multiplexed transparently with the present invention. The present invention includes logic changes to standard OTUk framers and a slightly wider client clock generation loop bandwidth. Additionally, the present invention applies to the asynchronous mapping (CBRx-a) process to generate an OTU2 with an asynchronous mapped 100% transparent 10 GbE LAN-PHY signal. In the asynchronous mapping case, two additional NJO's and PJO's are provided to support ±100 PPM.

Figure 1:
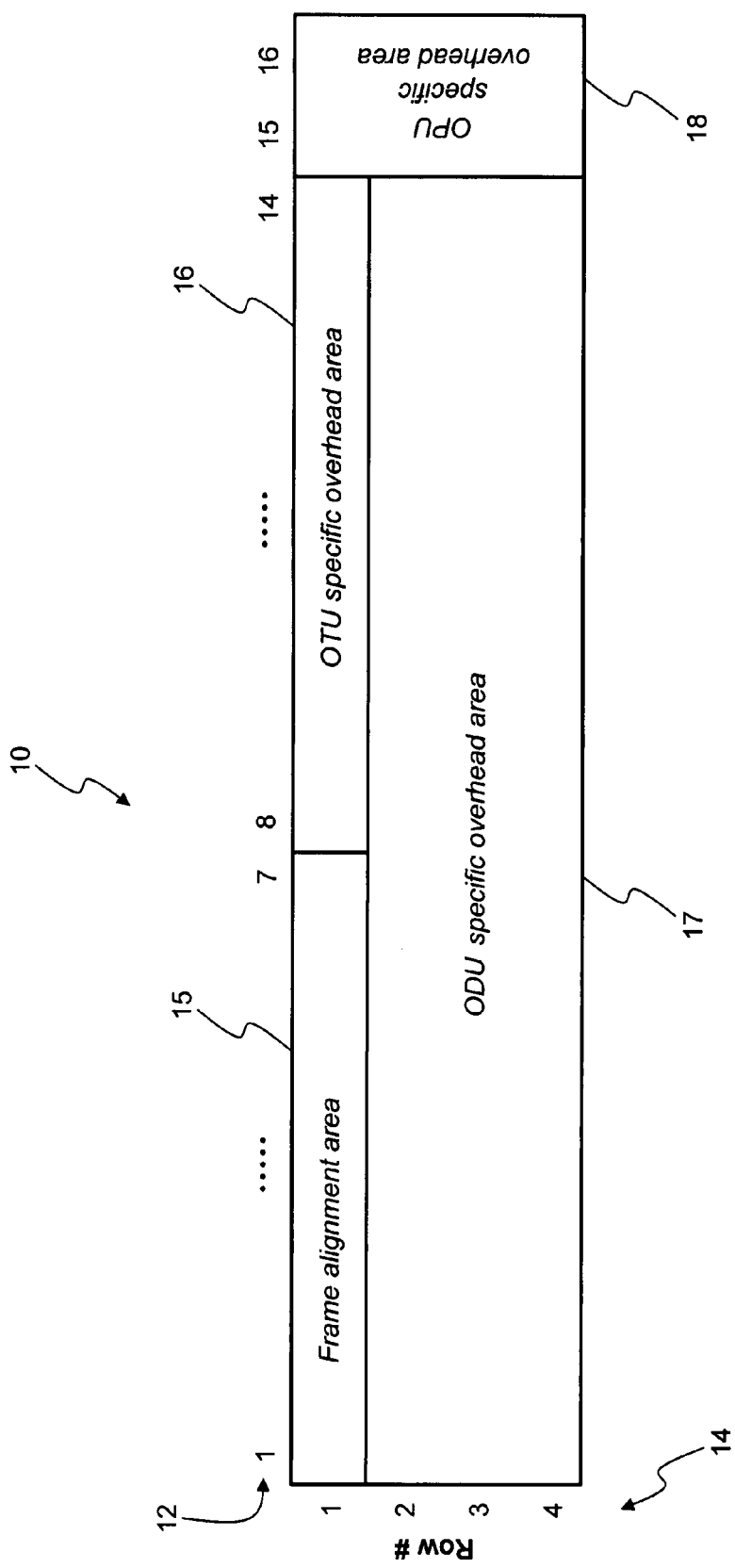
FIG. 1 is a block diagram of G.709 OTUk, ODUk and OPUk overhead.

Referring to FIG. 1, G.709 OTUk, ODUk and OPUk overhead 10 is illustrated. The G.709 overhead 10 includes columns 12 and rows 14. There are sixteen columns 12 and four rows 14, i.e. an octet-based block frame structure. A frame alignment area 15 includes framing bytes (e.g., OA1/OA2 bytes) and alignment signals (e.g., MFAS bytes). An Optical channel Transmission Unit (OTU) specific overhead area 16 includes a trail trace identifier (e.g., TTI bytes), section monitoring (e.g., SM bytes), and general communication bytes (e.g., GCC0). An Optical channel Data Unit (ODU) specific overhead area 17 includes path monitoring (e.g., PM bytes), Automatic Protection Switching/Protection Communications Channel bytes (e.g., APS/PCC bytes), general communication bytes (e.g., GCC1/2 bytes), and the like. An Optical channel Payload Unit (OPU) specific overhead area 18 includes Payload Signal Identifier (e.g., PSI bytes), Justification Control (e.g., JC bytes), and justification opportunities (e.g., NJO and PJO bytes). As described herein, OTUk, ODUk, and OPUk each represent a signal of level k, where k is currently defined for k=1, 2, 3. Those of ordinary skill in the art will recognize that the systems and methods of the present invention as described herein can apply to any level of k including newly defined levels (e.g., k=4, 5, etc.).

Figure 2:
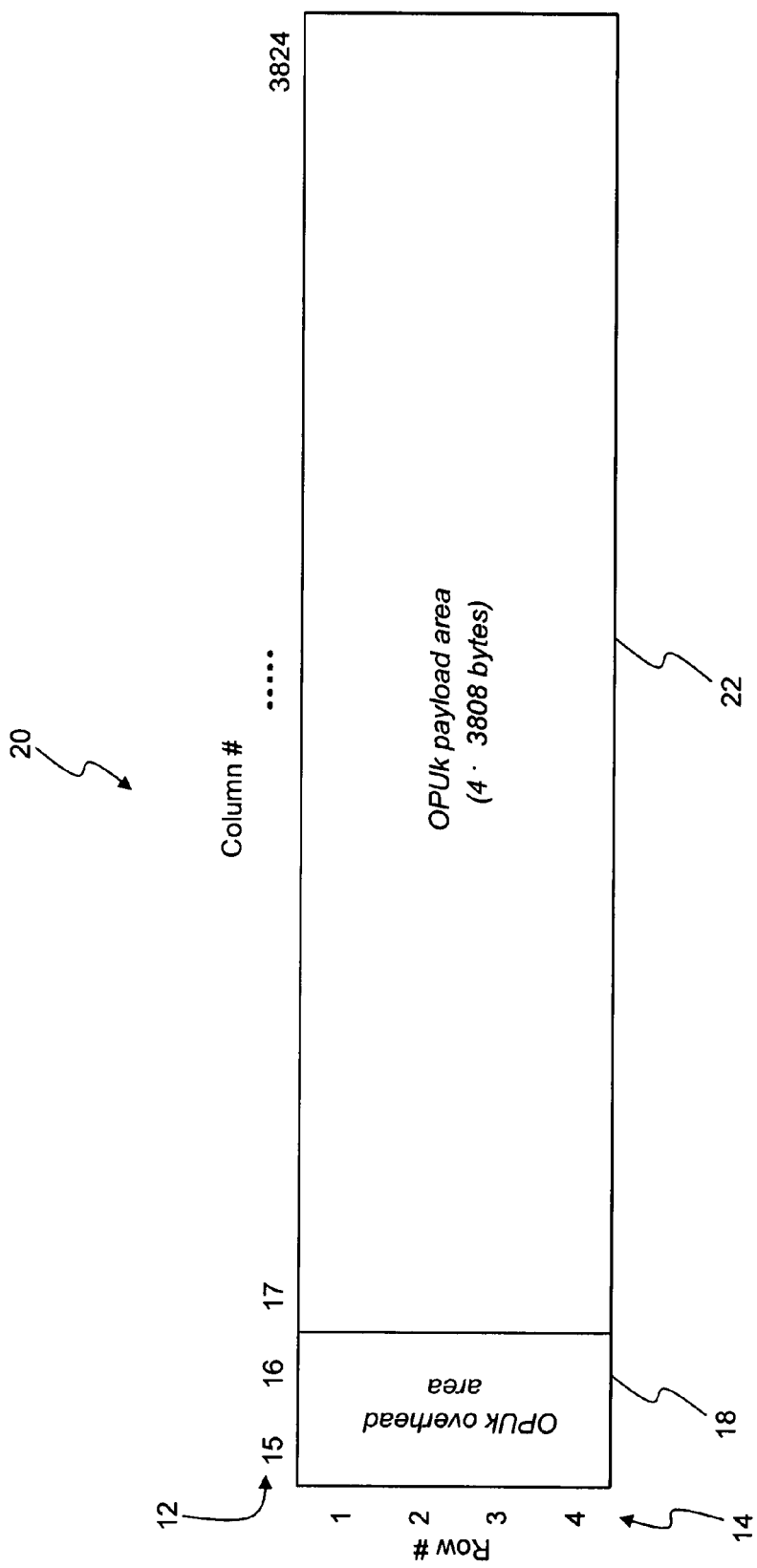
FIG. 2 is a block diagram of an OPUk frame.

Referring to FIG. 2, an OPUk frame 20 structure is illustrated. The OPUk frame 20 is an octet-based block frame structure with four rows 14 and 3810 columns 12. The OPUk frame 20 includes the OPUk specific overhead area 18 in the first two columns 12. An OPUk payload area 22 includes 4·3808 bytes in columns 17 through 3824. The OPUk frame 20 and OTUk, ODUk and OPUk overhead 10 are defined in ITU-T Recommendation G.709/Y.1331, "Interfaces for the Optical Transport Network (OTN)," March 2003), which is herein incorporated by reference in-full.

Figure 3:
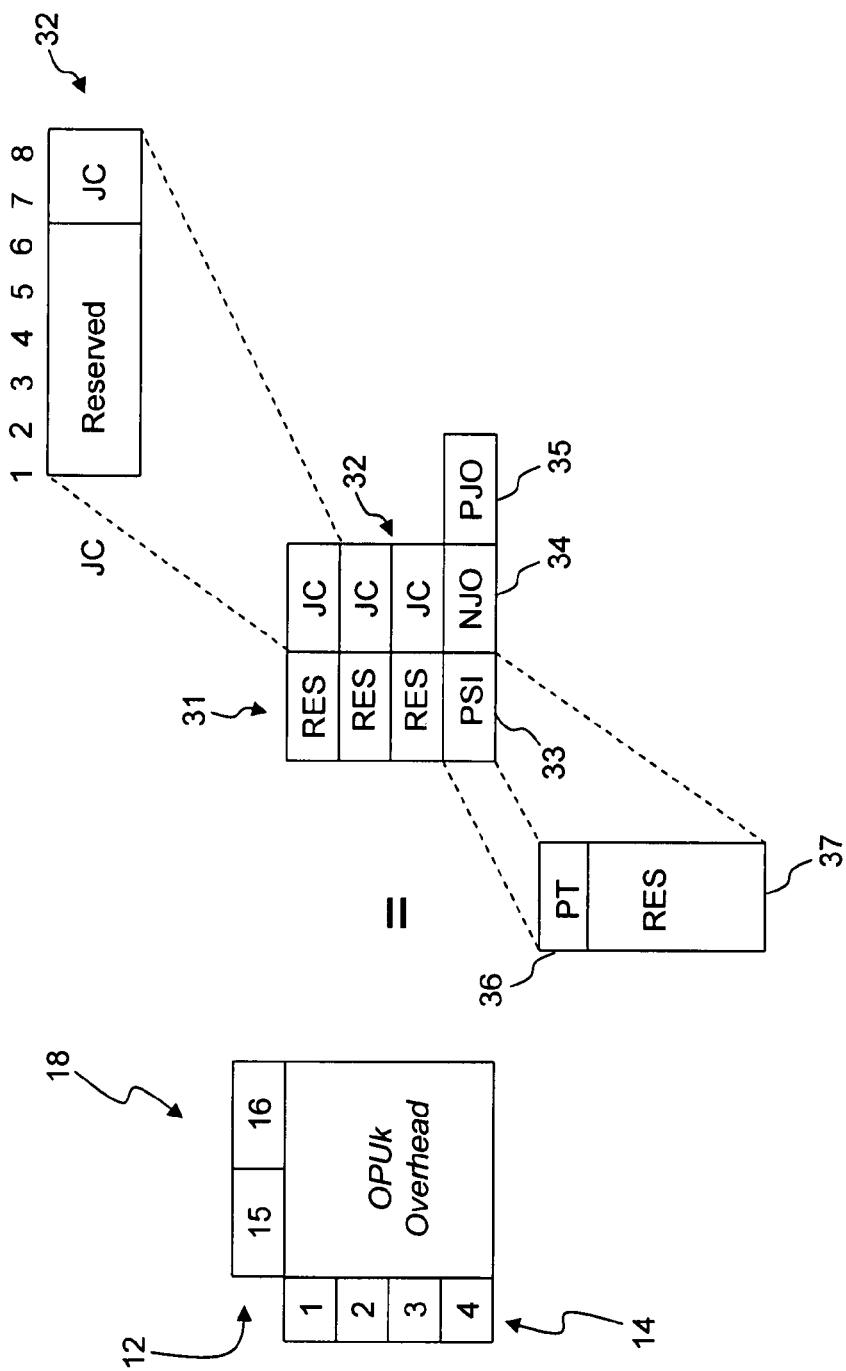
FIG. 3 is a block diagram of the details of the OPUk overhead.

Referring to FIG. 3, details of the OPUk overhead 18 are illustrated. The OPUk overhead 18 contains information to support the adaptation of client signal, such as OC-192, 10GbE LAN-PHY, OTU2@10.7 Gb/s, OTU2-LAN@11.05 Gb/s, OTU2-LAN@ 11.1 Gb/s, and the like. The bytes used in the OPUk overheard 18 vary depending on the client signal being mapped into the OPU payload. Reserved bytes 31 are undefined and reserved for future international standardization. OPUk payload structure identifier (PSI) 33 includes OPUk payload type (PT) 36 and reserved bytes 37. The PT 36 is a one-byte payload type identifier to identify payload types, such as Asynchronous Constant Bit-Rate (CBR) mapping, Bit synchronous CBR mapping, ATM mapping, GFP mapping, Virtual Concatenated signal, etc.

Justification Control (JC) 32, Negative Justification Opportunity (NJO) 34, and Positive Justification Opportunity (PJO) 35 are reserved in the OPUk overhead for mapping and concatenation specific overhead. These bytes are located in rows 1 to 3, columns 15 and 16 and column 16, row 4. In addition, the reserved bytes 37 in the PSI are reserved for mapping and concatenation specific purposes. The use of these bytes depends on the specific client signal mapping and the use of concatenation. NJO 34 and PJO 35 are used as stuff bytes, such as for asynchronous client signals. If the client signal rate is lower than OPU rate, then extra stuff bytes are inserted to fill out the OPU frame 20. Similarly, if the incoming client signal is slightly higher than the OPU rate, NJO 34 and PJO 35 bytes can be replaced with client information, i.e. the OPU payload capacity is increased slightly to accommodate the extra traffic.

The JC 32 bytes, which are located in rows 1, 2 and 3 of column 16, bits 7 and 8, is used to control the two justification opportunity bytes NJO and PJO that follow in row 4. The JC 32 bytes reflect whether NJO 34 and PJO 35 are data or stuff bytes, and the JC 32 bytes are used to demap or demultiplex the client signal. The JC 32 bytes consist of two bits for justification control and six bits reserved for future international standardization. The following table provides the JC 32 byte values for negative (NJO 34) and positive (PJO 35) justification by an asynchronous mapping process:

| JC bits | | NJO | PJO |
|---|---|---|---|
| 7 | 8 | | |
| 0 | 0 | justification byte | data byte |
| 0 | 1 | data byte | data byte |
| 1 | 0 | not generated | |
| 1 | 1 | justification byte | justification byte |

The following table provides the JC 32 byte values for negative (NJO 34) and positive (PJO 35) justification by a bit synchronous mapping process:

| JC bits | | NJO | PJO |
|---|---|---|---|
| 7 | 8 | | |
| 0 | 0 | justification byte | data byte |
| 0 | 1 | Not generated | Not generated |
| 1 | 0 | Not generated | Not generated |
| 1 | 1 | Not generated | Not generated |

The following table provides the JC 32 byte values for the demapping process:

| JC bits | | NJO | PJO |
|---|---|---|---|
| 7 | 8 | | |
| 0 | 0 | justification byte | data byte |
| 0 | 1 | data byte | data byte |
| 1 | 0 (Note) | justification byte | data byte |
| 1 | 1 | justification byte | justification byte |

NOTE
A mapper circuit does not generate this code. Due to bit errors a demapper circuit might receive this code.

For asynchronous CBR client mappings, any frequency difference between the client and local OPUk server clocks is accommodated by the +1/0/−1 justification scheme. For asynchronous multiplexing of ODUj into ODUk (k>j), any frequency difference between the client ODUj and local OPUk server clocks is accommodated by the +2/+1/0/−1 justification scheme. The ODU1, ODU2, and ODU3 rates are 239/238, 239/237, and 239/236 times 2 488 320 kbit/s, 9 953 280 kbit/s, and 39 813 120 kbit/s, respectively. The ODUk bit-rate tolerances are ±20 ppm.

| ODU type | ODU nominal bit rate | ODU bit-rate tolerance |
|---|---|---|
| ODU1 | 239/238 × 2 488 320 kbit/s | ±20 ppm |
| ODU2 | 239/237 × 9 953 280 kbit/s | |
| ODU3 | 239/236 × 39 813 120 kbit/s | |

NOTE
The nominal ODUk rates are approximately: 2 498 775.126 kbit/s (ODU1), 10 037 273.924 kbit/s (ODU2) and 40 319 218.983 kbit/s (ODU3).

Referring to FIG. 4, in an exemplary embodiment of the present invention, additional negative (NJO) and positive (PJO) justification opportunities are added to the OPUk mapping process to accommodate wide clock tolerance signals. An OPUk frame 40 includes one or more additional NJO and PJO bytes to extend the range of client clock signals. In this embodiment, the additional NJO bytes are included in column 15, rows 1-3, in the Reserved bytes 31 illustrated in FIG. 3. The additional PJO bytes are included within the OPUk payload area. A PJO byte nominally carries client data and is only used when client data is not needed (i.e., as a stuff byte), accordingly PJO bytes are effectively free and do not require extras space. The PJO bytes are spaced across data rows to avoid large phase/Unit Interface (UI) gaps in data. Also, the NJO and PJO bytes are re-ordered to avoid a phase/UI gap between NJO1-NJO2 and PJO1-PJO2.

Unused bits in JC bytes are used to indicate these additional NJO and PJO justifications including ±4, 3, 2, 1, or 0 justifications. In an exemplary embodiment JC bits 5 and 6 are utilized to indicate these additional justifications with bits 1 through 4 remaining reserved (i.e., undefined). As described herein, JC bits 1 through 6 are reserved and currently undefined. Those of ordinary skill in the art will recognize that other combinations of JC bits could be used. The following table illustrates an exemplary embodiment of the JC bits:

| JC bits | | | | NJO | PJO |
|---|---|---|---|---|---|
| 5 | 6 | 7 | 8 | | |
| 0 | 0 | 0 | 0 | justification bytes in NJO1-4 | data bytes in PJO1-4 |
| 0 | 0 | 0 | 1 | data byte in NJO1 and | data bytes in PJO1-4 |

-continued

| | JC bits | | | | |
|---|---|---|---|---|---|
| 5 | 6 | 7 | 8 | NJO | PJO |
| | | | | justification bytes in NJO2-4 | |
| 0 | 1 | 0 | 1 | data bytes in NJO1-2 and justification bytes in NJO3-4 | data bytes in PJO1-4 |
| 1 | 0 | 0 | 1 | data bytes in NJO1-3 and justification byte in NJO4 | data bytes in PJO1-4 |
| 1 | 1 | 0 | 1 | data bytes in NJO1-4 | data bytes in PJO1-4 |
| 0 | 0 | 1 | 0 | justification bytes in NJO1-4 | data bytes in PJO3-4 and justification bytes in PJO1-2 |
| 0 | 0 | 1 | 1 | justification bytes in NJO1-4 | data bytes in PJO2-4 and justification byte in PJO1 |
| 0 | 1 | 1 | 0 | justification bytes in NJO1-4 | data byte in PJO4 and justification bytes in PJO1-3 |
| 1 | 0 | 1 | 0 | justification bytes in NJO1-4 | justification bytes in PJO1-4 |

Referring to FIG. 5, a table 45 illustrates a calculation of the required NJO/PJO bytes for different bit-rate tolerances for the OPUk mapping process to accommodate wide clock tolerance signals according to the exemplary embodiment illustrated in FIG. 4. The table 45 shows calculations for a value α which represents the average long-term justification rate and includes a negative offset, zero offset, and positive offset. α is the average number of justification bytes used each frame to carry the client in the source signal. For example, if a transport source signal can carry 1000 (or maybe 15232) bytes of client data every frame, and the client signal rate requires 1001 (or maybe 15233) bytes per frame, then 1 NJO will be used each frame and α will be 1. If the client signal rate requires only 999 (or maybe 15231) bytes per frame then 1 PJO will be used each frame and α will be −1. Appendix I in ITU-T G.709 (March 2003) includes detailed calculation of α illustrating the formulas used herein with regards to table 45.

The first column of table 45 includes the mapping type, i.e. ODU1, ODU2, and ODU3. The second column includes the available ODUk bytes for mapping which is equal to 15296 for all calculations (i.e., 4·3824 which is the rows times columns in the ODUk frame). The next two columns, M and N, represent the ratio, M/N, of ODUk bytes to OC-n bytes. For example, the payload space in an ODU1 is designed so that it fits an OC-48 signal. For every 15232 bytes of the OC-48, there are 15232 bytes of payload space and 64 additional overhead ODU1 bytes. So ratio of ODU1 bytes to OC-48 bytes is 15296/3808. Both numbers are divisible by 64 so it simplifies to a ratio of 239/238. The nominal ODU1 rate is 239/238·OC-48 rate=239/238·248832 Gb/s=2.49878 Gb/s. So as long as the OC-48 is 2.48832 Gb/s and the ODU1 is 2.49878 Gb/s, then no NJO/PJO bytes are required because there is exactly enough payload space for the client signal. This is the zero offset case (client and source are at exactly the nominal frequencies) and α is zero since no NJO/PJO is required. If the client rate is offset from nominal by one byte every 15232, then the ODU1 will need an extra byte to carry the data (an NJO is used). The same thing happens if the client rate is nominal and the ODUk rate is offset or if both client and source rates are offset. Table 45 calculates the NJO/PJO usage at the maximum clock offsets allowed. $Y_c$ is the client rate offset from nominal (OC-48 signals are specified to be within a maximum offset of +/−20 ppm ($Y_c$=20). ODU1 signals are specified to be within a maximum offset of +/−20 ppm ($Y_s$=20). $Y_{absolute}$ is $Y_c+Y_s$=40 ppm. α is directly correlated with $Y_{absolute}$, and the larger $Y_{absolute}$ corresponds to a larger α.

Table 45 includes calculations of α for $Y_{absolute}$ equal to 40, 110, and 120 for each of the mapping types. The ST column represents the multiplication of S by T where S is the nominal STM-N or ODUj client rate (bytes/sec.) and T is the nominal ODUk frame period (in sec.). The ST column provides a number of bytes, and this is used in the calculation for α (the details of the calculation are provided in ITU-T G.709 Appendix I). The FSB column represents the Fixed Stuff Bytes (FSB) which are 0 for ODU1, 64 for ODU2, and 128 for ODU3 mappings. The available payload bytes column represents the available payload bytes in the OPUk frame for each mapping. In this embodiment, all mappings have 15232 bytes available, or 4·3808 bytes. As described in ITU-T G.709 Appendix I, equation I-5 provides that α=15232(β−1), where β is provided by equation I-2, β=1−$Y_c$−$Y_s$=1−$Y_{absolute}$. α is calculated with $Y_c$ and $Y_s$ at maximum values, zero value, and minimum values to provide the negative, zero, and positive offset, respectively.

Accordingly, table 45 provides calculations for a with a client offset ($Y_c$) at ±20 ppm and ±100 ppm (as is required by wider tolerance clock signals, such as 10 GbE LAN-PHY), and with a source offset ($Y_s$) of ±20 ppm, ±10 ppm, and ±20 ppm. The specified G.709 offset ($Y_c$=±20 ppm and $Y_s$=±20 ppm) provides −0.60928<α<0.60928 for ODU1, −0.60672<α<0.60672 for ODU2, and −0.60416<α<0.60416 for ODU3. As described herein, the existing one NJO/PJO opportunities in G.709 allows for rate offsets to meet these source and client offsets since α is less than one with some extra room for fast ppm changes in the source or client. However, when $Y_c$ is at ±100 ppm, additional offsets are required as provided for in the exemplary embodiment of FIG. 4. Where $Y_c$=±100 ppm and $Y_s$=±10 ppm, the calculation provides −1.67552<α<1.67552 for ODU1, −1.66848<α<1.66848 for ODU2, and −1.66144<α<1.66144 for ODU3, and where $Y_c$=±100 ppm and $Y_s$=±20 ppm, the calculation provides −1.82784<α<1.82784 for ODU1, −1.82016<α<1.82016 for ODU2, and −1.81248<α<1.81248 for ODU3. Therefore, adding 1, 2, or 3 additional NJO/PJO bytes to the OPUk mapping process allows wider tolerance on the client and source signals.

The following table provides the additional NJO/PJO justification opportunities for the OPUk mapping with ODU2-LAN rates of 10.3125 Gb/s·239/238:

| Justification Opportunities per frame | Fixed Stuff | Mapping M/N | Client PPM | Source PPM | Total PPM | Long Term Justification rate per frame |
|---|---|---|---|---|---|---|
| G.709 | 0 | 239/238 | ±20 | ±20 | ±40 | ±0.60928 |
| G.709 + 1 NJO/PJO | 0 | 239/238 | ±100 | ±20 | ±120 | ±1.82784 |
| G.709 + 2 NJO/PJO | 0 | 239/238 | ±150 | ±20 | ±170 | ±2.58944 |
| G.709 + 3 NJO/PJO | 0 | 239/238 | ±220 | ±20 | ±240 | ±3.65568 |

The following table provides the additional NJO/PJO justification opportunities for the OPUk mapping with ODU2-LAN rates of 10.3125 Gb/s·239/237:

| Justification Opportunities per frame | Fixed Stuff | Mapping M/N | Client PPM | Source PPM | Total PPM | Long Term Justification rate per frame |
|---|---|---|---|---|---|---|
| G.709 | 64 | 239/237 | ±20 | ±20 | ±40 | ±0.60672 |
| G.709 + 1 NJO/PJO | 64 | 239/237 | ±90 | ±20 | ±110 | ±1.66848 |
| G.709 + 2 NJO/PJO | 64 | 239/237 | ±150 | ±20 | ±170 | ±2.57856 |
| G.709 + 3 NJO/PJO | 64 | 239/237 | ±220 | ±20 | ±240 | ±3.64032 |

As shown in the above tables, one additional NJO/PJO justification opportunity (note, G.709 specifies one NJO/PJO already) is required to provide for a client offset of ±100 ppm, two opportunities for ±150 ppm, and three opportunities for ±220 ppm. The exemplary embodiment of FIG. 4 provides for up to four additional NJO/PJO justification opportunities. Those of ordinary skill in the art will recognize that the embodiment of FIG. 4 can be modified to include 1, 2, or 3 additional justification opportunities as required by the specific client and source offset.

Referring to FIG. 6, in an exemplary embodiment of the present invention, additional negative (NJO) and positive (PJO) justification opportunities are added to the Optical channel Data Tributary Unit jk (ODTUjk) multiplexing process to accommodate wide clock tolerance signals. An OPUk frame 50 includes one or more additional NJO and PJO bytes to extend the range of client clock signals. In this embodiment, the additional NJO bytes are included in column 15, rows 1-3, in the Reserved bytes 31 illustrated in FIG. 3. The additional PJO bytes are included within the OPUk payload area. The PJO bytes are spaced across data rows to avoid large phase/UI gaps in data. Also, the NJO and PJO bytes are re-ordered to avoid a phase/UI gap between NJO1-NJO2 and PJO2-PJO3.

Unused bits in JC bytes are used to indicate these additional NJO and PJO justifications including +5, ±4, ±3, ±2, ±1, or 0 justifications. In an exemplary embodiment JC bits 5 and 6 are utilized to indicate these additional justifications with bits 1 through 4 remaining reserved (i.e., undefined). As described herein, JC bits 1 through 6 are reserved and currently undefined. Those of ordinary skill in the art will recognize that other combinations of JC bits could be used. The following table illustrates an exemplary embodiment of the JC bits:

| JC bits | | | | NJO | PJO |
|---|---|---|---|---|---|
| 5 | 6 | 7 | 8 | | |
| 0 | 0 | 0 | 0 | justification bytes in NJO1-4 | data bytes in PJO1-4 |
| 0 | 0 | 0 | 1 | data byte in NJO1 and justification bytes in NJO2-4 | data bytes in PJO1-4 |
| 0 | 1 | 0 | 1 | data bytes in NJO1-2 and justification bytes in NJO3-4 | data bytes in PJO1-4 |
| 1 | 0 | 0 | 1 | data bytes in NJO1-3 and justification byte in NJO4 | data bytes in PJO1-4 |
| 1 | 1 | 0 | 1 | data bytes in NJO1-4 | data bytes in PJO1-4 |
| 0 | 0 | 1 | 0 | justification bytes in NJO1-4 | data bytes in PJO3-5 and justification bytes in PJO1-2 |
| 0 | 0 | 1 | 1 | justification bytes in NJO1-4 | data bytes in PJO2-5 and justification byte in PJO1 |
| 0 | 1 | 1 | 0 | justification bytes in NJO1-4 | data byte in PJO4-5 and justification bytes in PJO1-3 |
| 1 | 0 | 1 | 0 | justification bytes in NJO1-4 | data byte in PJO5 and justification bytes in PJO1-4 |
| 1 | 1 | 1 | 0 | justification bytes in NJO1-4 | justification bytes in PJO1-4 |

Referring to FIG. 7, a table 55 illustrates a calculation of the required NJO/PJO bytes for different bit-rate tolerances for the ODTUjk multiplexing process to accommodate wide clock tolerance signals according to the exemplary embodiment illustrated in FIG. 6. Table 55 utilizes the same calculations for $\alpha$ as illustrated in table 45 in FIG. 5. The first column of table 55 includes the multiplexing scheme including ODTU12, ODTU23, and ODTU13 with a for each scheme shown calculated for a client offset ($Y_c$) at ±20 ppm and ±100 ppm and a source offset ($Y_s$) of ±20 ppm. The specified G.709 offset ($Y_c=\pm20$ ppm and $Y_s=\pm20$ ppm) provides $-0.87818<\alpha<0.34036$ for ODTU12, $-1.14934<\alpha<0.06917$ for ODTU23, and $-1.14451<\alpha<0.06888$ for ODTU13. As described herein, the existing one NJO/PJO opportunities in G.709 allows for rate offsets to meet these source and client offsets since $\alpha$ is less than one with some extra room for fast ppm changes in the source or client. However, when $Y_c$ is at ±100 ppm, additional offsets are required as provided for in the exemplary embodiment of FIG. 6. With $Y_c=\pm100$ ppm and $Y_s=\pm20$ ppm, the calculation provides $-2.09672<\alpha<1.55890$ for ODTU12, $-2.36786<\alpha<1.28769$ for ODTU23, and $-2.35781<\alpha<1.28228$ for ODTU13. Therefore, adding 1, 2, 3, 4, or 5 additional NJO/PJO bytes to the ODTUjk multiplexing process allows wider tolerance on the client and source signals.

The following table provides the additional NJO/PJO justification opportunities for the ODTUjk multiplexing process with ODU2-LAN rates of 10.3125 Gb/s·239/236:

| Justification Opportunities per frame | Fixed Stuff | Multiplex M/N | Client PPM | Source PPM | Total PPM | Long Term PJO rate per frame | Long Term NJO rate per frame |
|---|---|---|---|---|---|---|---|
| G.709 | 64 | 4 × 239/236 | ±20 | ±20 | ±40 | ±1.14451 | ±0.06888 |
| G.709 + 1 NJO/PJO | 64 | 4 × 239/236 | ±120 | ±20 | ±140 | ±2.66126 | ±1.58563 |

-continued

| Justification Opportunities per frame | Fixed Stuff | Multiplex M/N | Client PPM | Source PPM | Total PPM | Long Term PJO rate per frame | Long Term NJO rate per frame |
|---|---|---|---|---|---|---|---|
| G.709 + 2 NJO/PJO | 64 | 4 × 239/236 | ±180 | ±20 | ±200 | ±3.57131 | ±2.49568 |
| G.709 + 3 NJO/PJO | 64 | 4 × 239/236 | ±250 | ±20 | ±270 | ±4.63303 | ±3.55740 |

The following table provides the additional NJO/PJO justification opportunities for the ODTUjk multiplexing process with ODU2-LAN rates of 10.3125 Gb/s·239/237:

| Justification Opportunities per frame | Fixed Stuff | Multiplex M/N | Client PPM | Source PPM | Total PPM | Long Term PJO rate per frame | Long Term NJO rate per frame |
|---|---|---|---|---|---|---|---|
| G.709 | 0 | 4 × 239/237 | ±20 | ±20 | ±40 | ±1.14934 | ±0.06917 |
| G.709 + 1 NJO/PJO | 0 | 4 × 239/237 | ±120 | ±20 | ±140 | ±2.67249 | ±1.59232 |
| G.709 + 2 NJO/PJO | 0 | 4 × 239/237 | ±180 | ±20 | ±200 | ±3.58638 | ±2.50621 |
| G.709 + 3 NJO/PJO | 0 | 4 × 239/237 | ±250 | ±20 | ±270 | ±4.65258 | ±3.57241 |

As shown in the above tables, one additional NJO/PJO justification opportunity (note, G.709 specifies one NJO/PJO already) is required to provide for a client offset of ±100 ppm, two opportunities for ±150 ppm, and three opportunities for ±220 ppm. The exemplary embodiment of FIG. 6 provides for up to four additional NJO/PJO justification opportunities. Those of ordinary skill in the art will recognize that the embodiment of FIG. 6 can be modified to include 1, 2, or 3 additional justification opportunities as required by the specific client and source offset.

Advantageously, the exemplary embodiments of FIGS. 4-7 utilize existing reserved and undefined bytes in the OPUk overhead for the additional NJO justifications providing wide tolerance offsets without requiring a positive offset in the rate of the OTUk. Alternatively, the additional NJO justifications can be included with the payload area of the OPUk frame along with a slight positive offset in the OTUk rate to adjust the ODUk rate to compensate for the addition of NJO bytes in the payload area.

Referring to FIG. 8, in an exemplary embodiment of the present invention, additional negative (NJO) and positive (PJO) justification opportunities are added to the OPUk mapping process to accommodate wide clock tolerance signals along with a slight positive OTUk offset. An OPUk frame 60 includes one or more additional NJO and PJO bytes to extend the range of client clock signals. In this embodiment, the additional NJO bytes are included in column 17, rows 1-3 within the OPUk payload area. The additional PJO bytes are also included within the OPUk payload area in column 18, rows 1-3. A PJO byte nominally carries client data and is only used when client data is not needed (i.e., as a stuff byte), accordingly PJO bytes are effectively free and do not require extras space. The PJO bytes are spaced across data rows to avoid large phase/Unit Interface (UI) gaps in data. Also, the NJO and PJO bytes are re-ordered to avoid a phase/UI gap between NJO1-NJO2 and PJO1-PJO2. The addition of three additional NJO justification bytes in the OPUk payload reduces the available payload area by three bytes. Accordingly, the ODUk rate is increased by 3 bytes/frame to compensate for the additional NJO opportunities which are included in the OPUk payload. Advantageously, this embodiment preserves the existing OTN standards by not utilizing reserved bytes in the OPUk overhead.

Unused bits in JC bytes are used to indicate these additional NJO and PJO justifications including ±4, 3, 2, 1, or 0 justifications. In an exemplary embodiment JC bits 5 and 6 are utilized to indicate these additional justifications with bits 1 through 4 remaining reserved (i.e., undefined). As described herein, JC bits 1 through 6 are reserved and currently undefined. Those of ordinary skill in the art will recognize that other combinations of JC bits could be used. In an exemplary embodiment, the JC bits can be the same as illustrated herein with regards to OPUk frame 40 in FIG. 4.

Referring to FIG. 9, a table 65 illustrates a calculation of the required NJO/PJO bytes for different bit-rate tolerances for the OPUk mapping process to accommodate wide clock tolerance signals according to the exemplary embodiment illustrated in FIG. 8. The $\alpha$ calculations in table 65 are the same as presented herein with regards to table 45. Additionally, table 65 provides similar a values as presented in table 45 with minor differences because the available payload bytes are reduced from 15232 to 15229 due to the three NJO bytes.

The specified G.709 offset ($Y_c$=±20 ppm and $Y_s$=±20 ppm) provides $-0.60916 < \alpha < 0.60916$ for ODU1, $-0.6066 < \alpha < 0.6066$ for ODU2, and $-0.60404 < \alpha < 0.60404$ for ODU3. As described herein, the existing one NJO/PJO opportunities in G.709 allows for rate offsets to meet these source and client offsets since $\alpha$ is less than one with some extra room for fast ppm changes in the source or client. However, when $Y_c$ is at ±100 ppm, additional offsets are required as provided for in the exemplary embodiment of FIG. 8. Where $Y_c = \pm 100$ ppm and $Y_s = \pm 100$ ppm, the calculation provides $-1.67519 < \alpha < 1.67519$ for ODU1, $-1.66815 < \alpha < 1.66815$ for ODU2, and $-1.66111 < \alpha < 1.6611$ for ODU3, and where $Y_c = \pm 100$ ppm and $Y_s = \pm 20$ ppm, the calculation provides $-1.82748 < \alpha < 1.82748$ for ODU1, $-1.8198 < \alpha < 1.8198$ for ODU2, and $-1.81212 < \alpha < 1.81212$ for ODU3. Therefore, adding 1, 2, or 3 additional NJO/PJO bytes to the OPUk mapping process and a slight positive frequency offset allows wider tolerance on the client and source signals.

Referring to FIG. 10, in an exemplary embodiment of the present invention, additional negative (NJO) and positive (PJO) justification opportunities are added to the ODTUjk multiplexing process to accommodate wide clock tolerance signals along with a slight positive OTUk offset. An OPUk frame 70 includes one or more additional NJO and PJO bytes to extend the range of client clock signals. In this embodiment, the additional NJO bytes are included in columns 17-20, rows 1-3, in the OPUk payload are. The additional PJO bytes are included in columns 21-24, rows 1-3 within the OPUk payload area. The PJO bytes are spaced across data rows to avoid large phase/UI gaps in data. Also, the NJO and PJO bytes are re-ordered to avoid a phase/UI gap between NJO1-NJO2 and PJO2-PJO3. The addition of three additional NJO justification bytes per tributary in the OPUk payload reduces the available payload area by three bytes. Accordingly, the ODUk rate is increased by 3 bytes/frame to compensate for the additional NJO opportunities which are included in the OPUk payload. Advantageously, this embodiment preserves the existing OTN standards by not utilizing reserved bytes in the OPUk overhead.

Unused bits in JC bytes are used to indicate these additional NJO and PJO justifications including +5, ±4, ±3, ±2, ±1, or 0 justifications. In an exemplary embodiment JC bits 5 and 6 are utilized to indicate these additional justifications with bits 1 through 4 remaining reserved (i.e., undefined). As described herein, JC bits 1 through 6 are reserved and currently undefined. Those of ordinary skill in the art will recognize that other combinations of JC bits could be used. In an exemplary embodiment, the JC bits can be the same as illustrated herein with regards to OPUk frame 40 in FIG. 6.

Referring to FIG. 11, a table 75 illustrates a calculation of the required NJO/PJO bytes for different bit-rate tolerances for the ODTUjk multiplexing process to accommodate wide clock tolerance signals according to the exemplary embodiment illustrated in FIG. 10. The $\alpha$ calculations in table 75 are the same as presented herein with regards to table 45. Additionally, table 75 provides similar $\alpha$ values as presented in table 55 with minor differences because the available payload bytes are reduced from 15232 to 15229 due to the three NJO bytes.

The specified G.709 offset ($Y_c = \pm 20$ ppm and $Y_s = \pm 20$ ppm) provides $-0.87806 < \alpha < 0.34024$ for ODTU12, $-1.14922 < \alpha < 0.06905$ for ODTU23, and $-1.14439 < \alpha < 0.06876$ for ODTU13. As described herein, the existing one NJO/PJO opportunities in G.709 allows for rate offsets to meet these source and client offsets since $\alpha$ is less than one with some extra room for fast ppm changes in the source or client. However, when $Y_c$ is at $\pm 100$ ppm, additional offsets are required as provided for in the exemplary embodiment of FIG. 10. With $Y_c = \pm 100$ ppm and $Y_s = \pm 20$ ppm, the calculation provides $-2.09636 < \alpha < 1.55854$ for ODTU12, $-2.36750 < \alpha < 1.28733$ for ODTU23, and $-2.35755 < \alpha < 1.28192$ for ODTU13. Therefore, adding 1, 2, 3, 4, or 5 additional NJO/PJO bytes to the ODTUjk multiplexing process allows wider tolerance on the client and source signals. Therefore, adding 1, 2, or 3 additional NJO/ PJO bytes to the OPUk mapping process and a slight positive frequency offset allows wider tolerance on the client and source signals.

Figure 12:
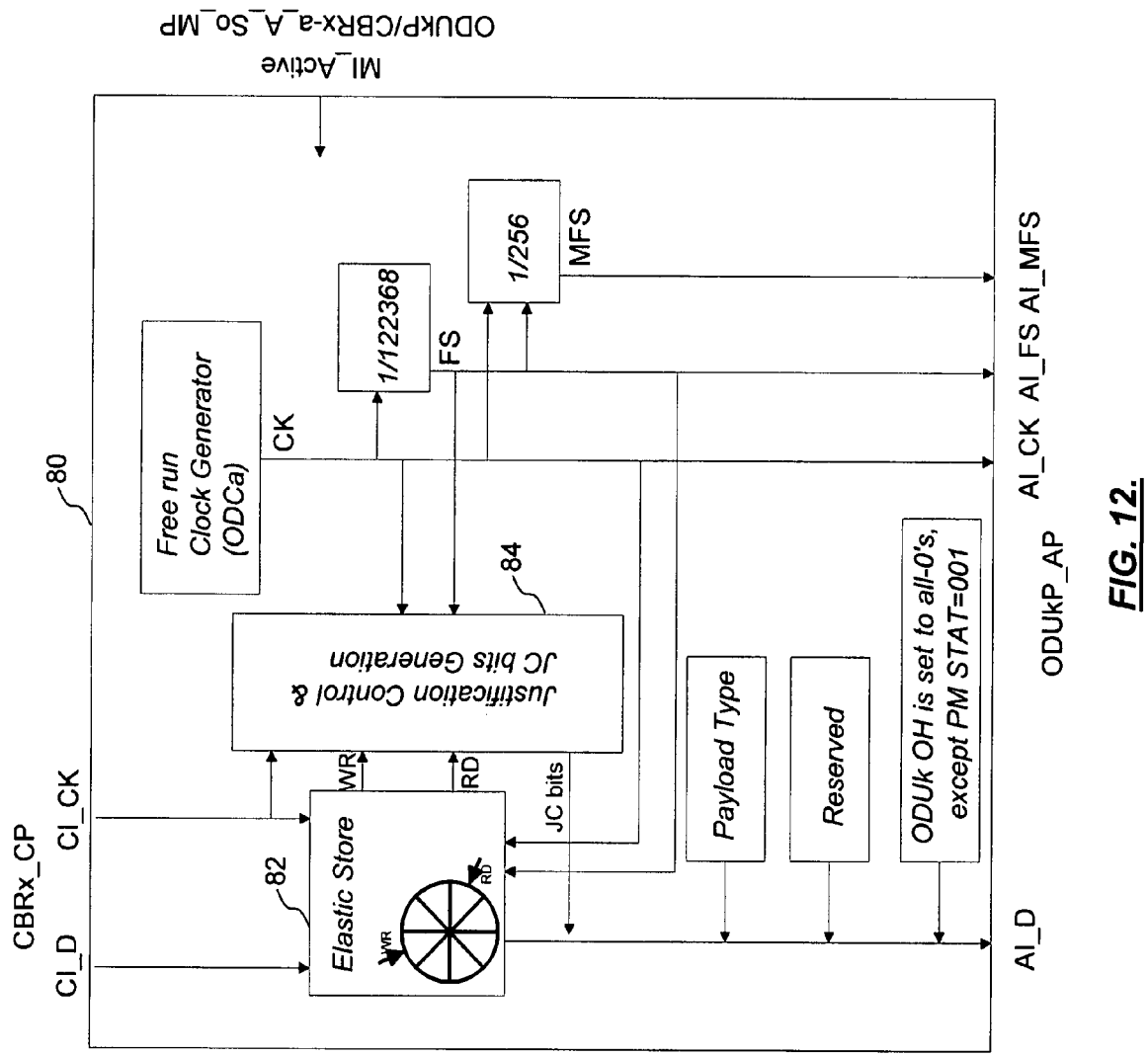
FIG. 12 is a block diagram of an ODUkP/CBRx-a_A_So source function.

Referring to FIG. 12, ITU-T Recommendation G.798 (June 2004), "Characteristics of optical transport network hierarchy equipment functional blocks", which is herein incorporated by reference in-full, includes adaptation source and sink processes for the mapping and multiplexing processes described herein. ODUkP/CBRx-a_A_So source function 80 creates the ODUk signal from a free running clock. The function 80 asynchronously maps $4^{(k-1)} \cdot 2\,488\,320$ kbit/s constant bit rate client signal from a CBRx_CP function into the payload of the OPUk (k=1, 2, 3), adds OPUk Overhead (RES, PT, JC), and default ODUk Overhead. The exemplary embodiments described herein in FIGS. 4-5 and 8-9 utilize the source function 80. In the present invention, an elastic store 82 and justification control & JC bits generation block 84 include modifications to accommodate the additional NJO and PJO justifications. The elastic store 82 requires a few bytes extra depth to handle additional NJO data and PJO justifications. The block 84 requires additional logic in the JC control to support the additional NJO and PJO states and the generation source requires additional logic to support the writing of extra JC bit codes. These modifications allow the function 80 to detect additional NJO/PJO requirements and coordinate additional NJO/PJO insertions.

Figure 13:
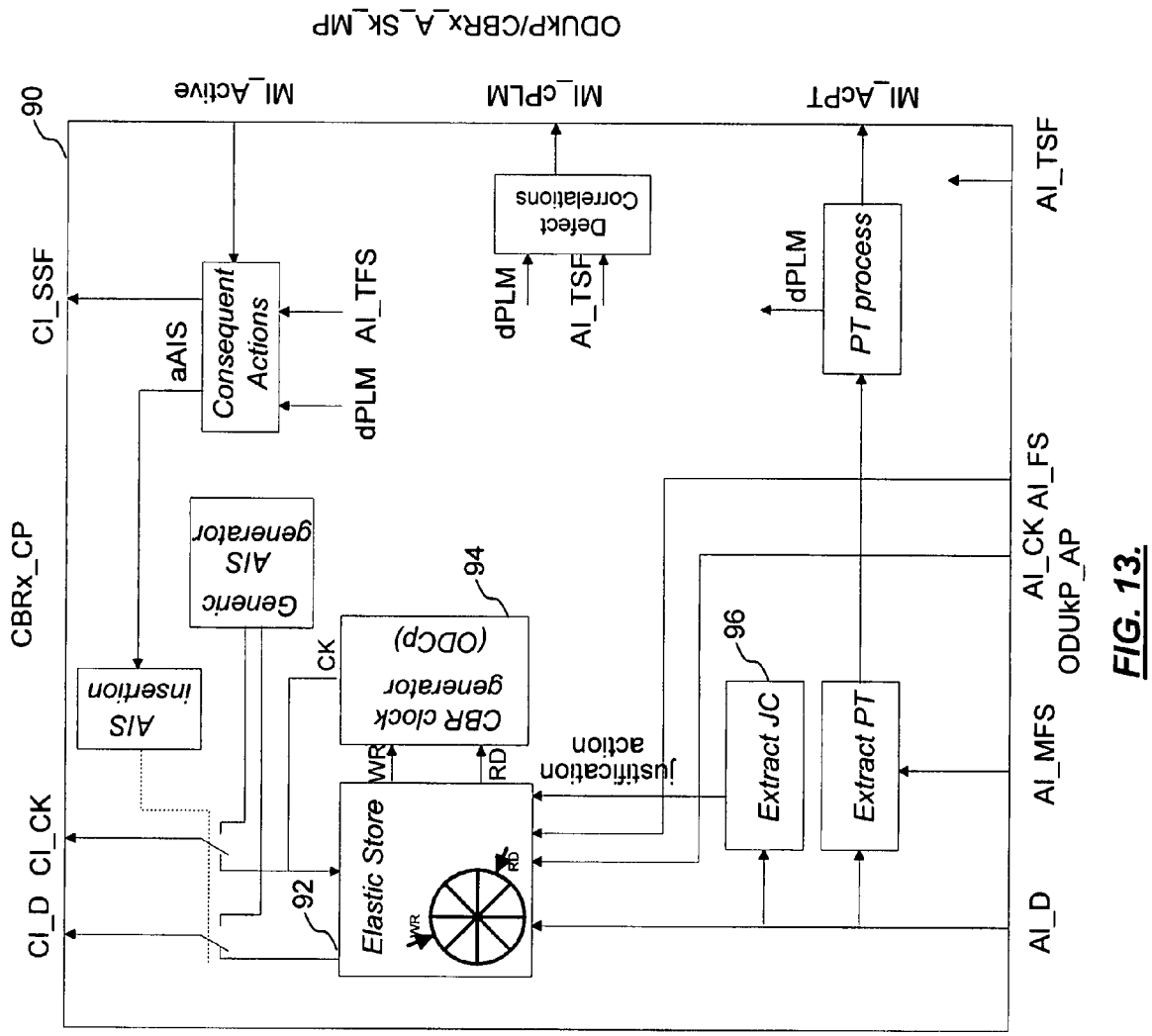
FIG. 13 is a block diagram of an ODUkP/CBRx_A_Sk sink function.

Referring to FIG. 13, ODUkP/CBRx_A_Sk sink function 90 recovers (i.e., de-maps) a $4^{(k-1)} \cdot 2\,488\,320$ kbit/s constant bit rate client signal from the OPUk payload using the justification control information (JC overhead) to determine if a data or stuff byte is present within the NJO and PJO bytes. The function 90 extracts the OPUk Overhead (PT, JC, and RES) and monitors the reception of the correct payload type. The exemplary embodiments described herein in FIGS. 4-5 and 8-9 utilize the sink function 90. In the present invention, an elastic store 92 requires a few extra bytes of depth to accommodate the additional NJO data and PJO stuffs. A CBR clock generator 94 includes support for a wider range of clock frequency generation. A JC extraction block 96 includes additional logic to recognize the additional JC codes and to coordinate data writes into the elastic store 92 responsive to the JC codes.

Figure 14:
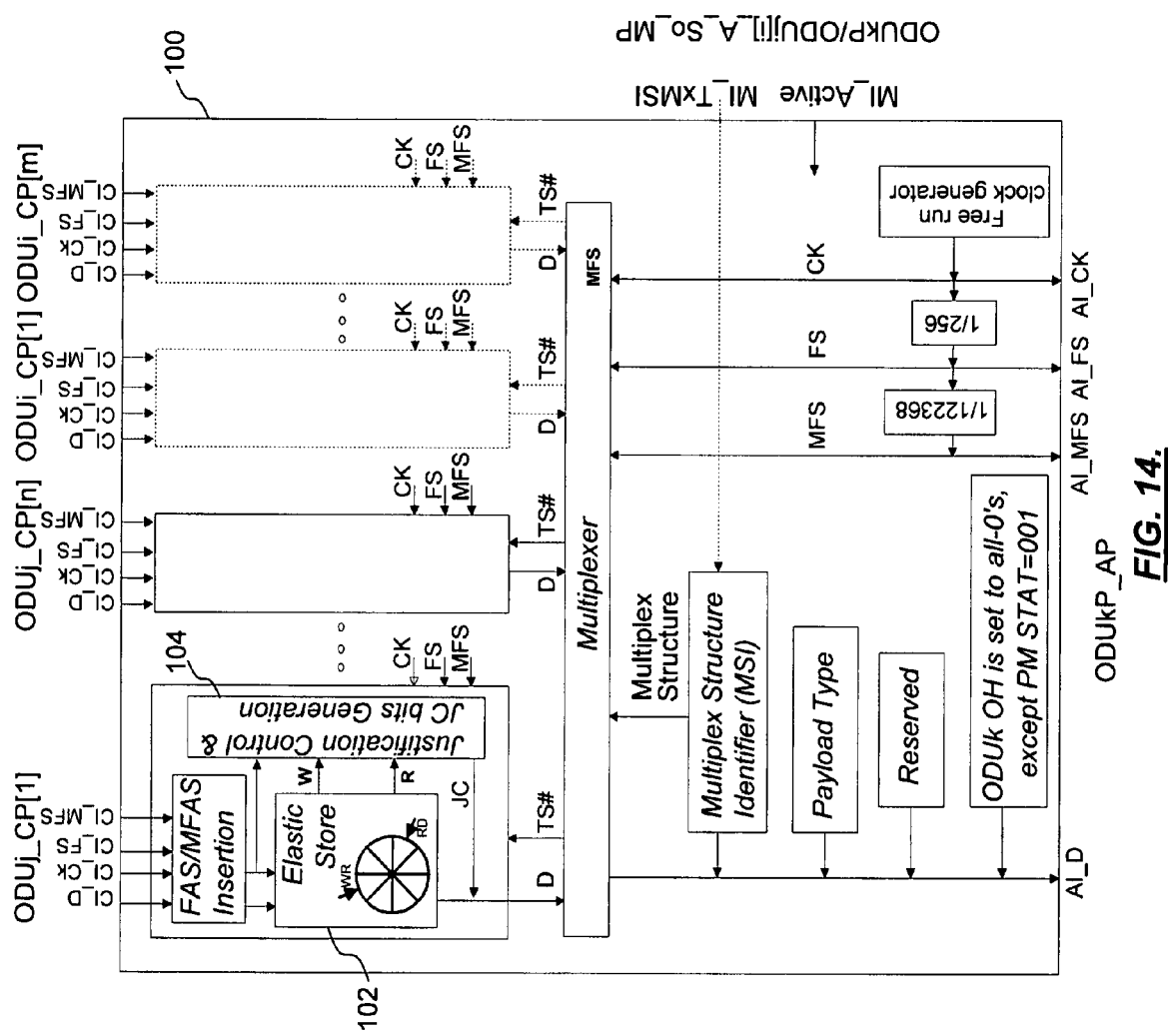
FIG. 14 is a block diagram of an ODUkP/ODU[i]j_A_So source function.

Referring to FIG. 14, a ODUkP/ODU[i]j_A_So source function 100 creates an ODUk signal from a free running clock. It asynchronously maps the ODUj [and ODUi] client signal from the ODUj_[and ODUi] CPs into ODTUjk[/ik] including justification control (JC) information. The ODTUjk[/ik] are multiplexed into the payload area of the OPUk. The exemplary embodiments described herein in FIGS. 6-7 and 10-11 utilize the source function 100. In the present invention, an elastic store 102 and justification control & JC bits generation block 104 include modifications to accommodate the additional NJO and PJO justifications. The elastic store 102 requires a few bytes extra depth to handle additional NJO data and PJO justifications. The block 104 requires additional logic in the JC control to support the additional NJO and PJO states and the generation source requires additional logic to support the writing of extra JC bit codes. These modifications allow the function 100 to detect additional NJO/PJO requirements and coordinate additional NJO/PJO insertions.

Figure 15:
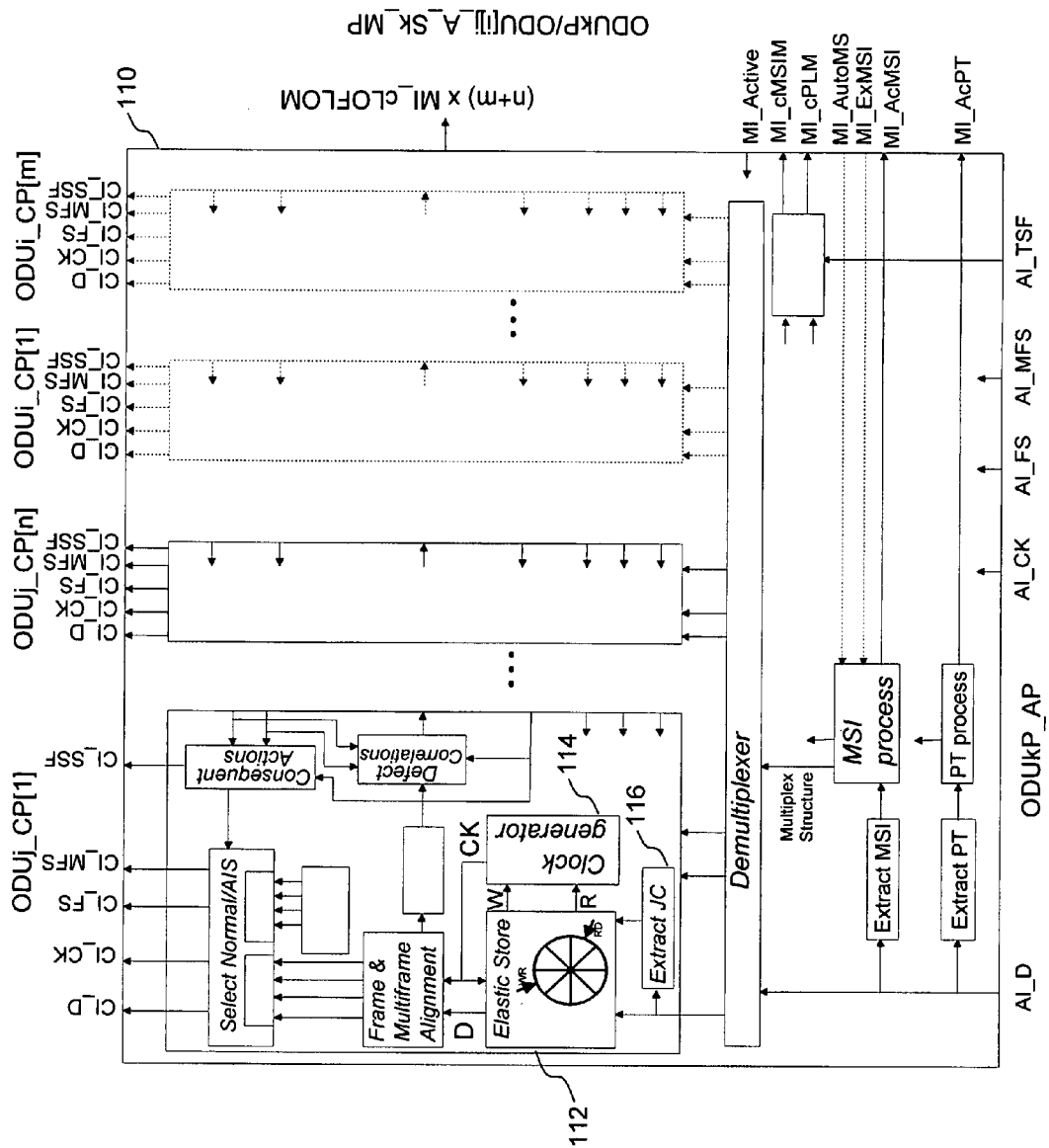
FIG. 15 is a block diagram of an ODUkP/ODU[i]j_A_Sk sink function.

Referring to FIG. 15, a ODUkP/ODU[i]j_A_Sk sink function 100 extracts the OPUk Overhead (PT, MSI, and RES) and monitors the reception of the correct payload type. The sink function 100 demultiplexes the individual ODTUj[/ik] from the payload area of the OPUk and recovers the ODUj[/i] signals using the justification control information (JC overhead). The exemplary embodiments described herein in FIGS. 6-7 and 10-11 utilize the sink function 110. In the present invention, an elastic store 112 requires a few extra bytes of depth to accommodate the additional NJO data and PJO stuffs. A CBR clock generator 114 includes support for a wider range of clock frequency generation. A JC extraction block 116 includes additional logic to recognize the additional JC codes and to coordinate data writes into the elastic store 112 responsive to the JC codes.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for supporting wide clock tolerance signals in a G.709 Optical Transport Network, comprising:
    adding one or more Negative Justification Opportunity bytes and one or more Positive Justification Opportunity bytes in a Optical Channel Payload of unit k frame; and
    utilizing one or more Justification Control bits to indicate the addition of the one or more Negative Justification Opportunity bytes and one or more Positive Justification Opportunity bytes;
    wherein the one or more Justification Control bits comprise unused bits specified in G.709; and
    wherein the one or more Positive Justification Opportunity bytes are located in a payload area of the Optical Channel Payload of unit k frame.

2. The method for supporting wide clock tolerance signals of claim 1, wherein the one or more Negative Justification Opportunity bytes are located in unused overhead bytes in the Optical Channel Payload of unit k frame.

3. The method for supporting wide clock tolerance signals of claim 2, wherein the method is utilized in Optical Channel Payload of unit k mapping processes.

4. The method for supporting wide clock tolerance signals of claim 2, wherein the method is utilized in Optical channel Data Tributary of unit jk multiplexing processes.

5. The method for supporting wide clock tolerance signals of claim 1, wherein the one or more Negative Justification Opportunity bytes are located in a payload area of the Optical Channel Payload of unit k frame; and
    wherein an Optical Channel Data Unit of level k rate is increased responsive to the one or more Negative Justification Opportunity bytes.

6. The method for supporting wide clock tolerance signals of claim 5, wherein the method is utilized in Optical Channel Payload of unit k mapping processes.

7. The method for supporting wide clock tolerance signals of claim 5, wherein the method is utilized in Optical channel Data Tributary of unit jk multiplexing processes.

8. The method for supporting wide clock tolerance signals of claim 1, wherein the quantity of one or more Negative Justification Opportunity bytes and one or more Positive Justification Opportunity bytes is selected responsive to desired source offset and client offset frequency.

9. The method for supporting wide clock tolerance signals of claim 8, wherein the client offset frequency comprises ±100 parts per million.

10. The method for supporting wide clock tolerance signals of claim 1, wherein one or more Positive Justification Opportunity bytes are spaced across rows in the Optical Channel Payload of unit k frame; and
    wherein the one or more Negative Justification Opportunity bytes and one or more Positive Justification Opportunity bytes are re-ordered.

11. An Optical Transport Network transponder supporting wide clock tolerance signals, comprising:
    a source block comprising:
        an elastic store comprising one or more extra bytes depth, wherein the extra bytes depth are responsive to one or more Negative Justification Opportunity bytes and one or more Positive Justification Opportunity bytes;
        a justification control block comprising logic to support the one or more Negative Justification Opportunity bytes and one or more Positive Justification Opportunity bytes; and
        a justification control bit generation block comprising logic to support writing extra justification control bit codes responsive to the one or more Negative Justification Opportunity bytes and one or more Positive Justification Opportunity bytes;
    a sink block comprising:
        an elastic store comprising one or more extra bytes depth, wherein the extra bytes depth are responsive to the one or more Negative Justification Opportunity bytes and one or more Positive Justification Opportunity bytes;
        a constant bit rate clock generator comprising support for the wide clock tolerance; and
        a justification control extraction block comprising logic to recognize the extra justification control bit codes responsive to the one or more Negative Justification Opportunity bytes and one or more Positive Justification Opportunity bytes;
    wherein the one or more Justification Control bits comprise unused bits specified in G.709; and
    wherein the one or more Positive Justification Opportunity bytes are located in a payload area of an Optical Channel Payload of unit k frame.

12. The Optical Transport Network transponder claim 11, wherein the one or more Negative Justification Opportunity bytes are located in unused overhead bytes in the Optical Channel Payload of unit k frame.

13. The Optical Transport Network transponder claim 11, wherein the one or more Negative Justification Opportunity bytes are located in the payload area of the Optical Channel Payload of unit k frame; and
    wherein an Optical Channel Data Unit of level k rate is increased responsive to the one or more Negative Justification Opportunity bytes.

14. The Optical Transport Network transponder claim 11, wherein the quantity of one or more Negative Justification Opportunity bytes and one or more Positive Justification Opportunity bytes is selected responsive to desired source offset and client offset frequency.

15. The Optical Transport Network transponder claim 11, wherein one or more Positive Justification Opportunity bytes are spaced across rows in the Optical Channel Payload of unit k frame; and
    wherein the one or more Negative Justification Opportunity bytes and one or more Positive Justification Opportunity bytes are re-ordered.

16. An Optical Transport Network multiplexer supporting wide clock tolerance signals, comprising:
    a source block comprising:
        an elastic store comprising one or more extra bytes depth, wherein the extra bytes depth are responsive to one or more Negative Justification Opportunity bytes and one or more Positive Justification Opportunity bytes;

a justification control block comprising logic to support the one or more Negative Justification Opportunity bytes and one or more Positive Justification Opportunity bytes; and a justification control bit generation block comprising logic to support writing extra justification control bit codes responsive to the one or more Negative Justification Opportunity bytes and one or more Positive Justification Opportunity bytes;

a sink block comprising:

an elastic store comprising one or more extra bytes depth, wherein the extra bytes depth are responsive to the one or more Negative Justification Opportunity bytes and one or more Positive Justification Opportunity bytes;

a constant bit rate clock generator comprising support for the wide clock tolerance; and a justification control extraction block comprising logic to recognize the extra justification control bit codes responsive to the one or more Negative Justification Opportunity bytes and one or more Positive Justification Opportunity bytes;

wherein the one or more Justification Control bits comprise unused bits specified in G.709; and wherein the one or more Positive Justification Opportunity bytes are located in a payload area of an Optical Channel Payload of unit k frame.

17. The Optical Transport Network multiplexer claim 16, wherein the one or more Negative Justification Opportunity bytes are located in unused overhead bytes in the Optical Channel Payload of unit k frame.

18. The Optical Transport Network multiplexer claim 16, wherein the one or more Negative Justification Opportunity bytes are located in the payload area of the Optical Channel Payload of unit k frame; and wherein an Optical Channel Data Unit of level k rate is increased responsive to the one or more Negative Justification Opportunity bytes.

19. The Optical Transport Network multiplexer claim 16, wherein the quantity of one or more Negative Justification Opportunity bytes and one or more Positive Justification Opportunity bytes is selected responsive to desired source offset and client offset frequency.

20. The Optical Transport Network multiplexer claim 16, wherein one or more Positive Justification Opportunity bytes are spaced across rows in the Optical Channel Payload of unit k frame; and wherein the one or more Negative Justification Opportunity bytes and one or more Positive Justification Opportunity bytes are re-ordered.

* * * * *